United States Patent [19]

Campana

[11] 4,054,776
[45] Oct. 18, 1977

[54] PROCESS AND COATED WELDING ROD FOR WELDING WHITE CAST IRON

[76] Inventor: Patsie Carmen Campana, 2614 Sherwood Drive, Lorain, Ohio 44053

[21] Appl. No.: 612,665

[22] Filed: Sept. 12, 1975

[51] Int. Cl.$^2$ .............................................. B23K 35/22
[52] U.S. Cl. .............................. 219/137 WM; 148/26; 219/146
[58] Field of Search ............... 75/123 CB; 148/24, 26; 219/73 R, 76, 137 WM, 145, 146; 428/385

[56] References Cited

U.S. PATENT DOCUMENTS

| | | | |
|---|---|---|---|
| 1,502,789 | 7/1924 | Lincoln | 219/145 X |
| 1,708,815 | 4/1929 | Wille | 219/146 |
| 3,023,302 | 2/1962 | Kennedy et al. | 148/26 X |
| 3,114,033 | 12/1963 | Elster et al. | 219/146 |
| 3,860,420 | 1/1975 | Nayar | 219/145 X |

*Primary Examiner*—Gerald P. Tolin
*Assistant Examiner*—N. D. Herkamp
*Attorney, Agent, or Firm*—Fay & Sharpe

[57] ABSTRACT

A process for the electric arc welding of cast iron, specifically white cast iron, is provided which comprises electrically applying to the cast iron to be welded, at welding temperatures, a welding material obtained by melting a welding rod containing, by weight, from about 2.30 to about 3.00 percent carbon, from about 0.03 to about 0.06 percent chromium, from about 0.01 to about 0.04 percent nickel, about 0.01 percent molybdenum, from about 0.82 to about 0.90 percent manganese, from about 0.023 to about 0.032 percent sulphur, from about 0.103 to about 0.115 percent phosphorus, about 2.64 percent silicon, with the balance being iron plus incidental impurities, with the welding rod having a low hydrogen flux.

16 Claims, No Drawings

PROCESS AND COATED WELDING ROD FOR WELDING WHITE CAST IRON

BACKGROUND OF THE INVENTION

The present invention relates to the welding of cast iron at ambient temperatures without the application of additional heat.

It is customary in the art to hot weld cast iron. In such processes, the cast iron structure which is to be welded is first heated by an external or supplemental means and then the welding material is applied thereto. Obviously, there are certain drawbacks or limitations associated with the implementation of such a hot welding process which are to be avoided or at least minimized, if at all possible. For example, it is often impossible to hot weld assembled cast iron structures which are placed in confined areas having limited access.

Accordingly, it is the primary objective of this invention to provide a means for welding cast iron at ambient temperatures without the application of supplemental heat.

In addition, it is a further object of the invention to provide various electrode structures which are especially suited for use in the process of the instant invention.

These and other objects of the invention will be obvious to those skilled in the art from a reading of the following specification and claims.

RELATED APPLICATIONS

On even date herewith, the inventor of the innovation described herein has also filed certain other applications which relate to the welding of various forms of cast iron. These applications are as follows: U.S. patent application Ser. No. 612,666, filed Sept. 12, 1975 entitled "A Process and Welding Rod for Welding Gray Cast Iron"; U.S. patent application Ser. No. 612,667, filed Sept. 12, 1975 entitled "A process and Welding Rod for the Welding of White Cast Iron;" U.S. patent application Ser. No. 612,674, filed Sept. 12, 1975 entitled "A Process and Welding Rod for the Welding of Malleable Cast Iron"; U.S. patent application Ser. No. 612,664, filed Sept. 12, 1975 entitled "A Process and Welding Rod for the Welding of Ductile Cast Iron".

SUMMARY OF THE INVENTION

Broadly stated the instant invention concerns a novel process for the electric arc welding of cast iron of the type generally referred to as white iron without the application of supplemental heat. Basically, this is accomplished by depositing a weld on the article to be welded by use of a unique welding rod having a suitable flux thereon.

More specifically the present invention relates to a a process for the electric arc welding of cast iron containing, by weight, about 1.80 to about 3.60 percent carbon, about 0.50 to about 1.90 percent silicon, about 0.25 to about 0.80 percent manganese, about 0.06 to about 0.20 percent sulphur, about 0.06 to about 0.18 percent phosphorus, with the balance being iron plus incidental impurities which comprises, electrically applying to the cast iron to be welded, at welding temperatures, a welding material obtained by melting a welding rod containing, by weight, from about 2.30 to about 3.00 percent carbon, from about 0.03 to about 0.06 percent chromium, from about 0.01 to about 0.04 percent nickel, about 0.01 percent molybdenum, from about 0.82 to about 0.90 percent manganese, from about 0.023 to about 0.032 percent sulphur, from about 0.103 to about 0.115 percent phosphorus, about 2.64 percent silicon, with the balance being iron plus incidental impurities with the welding rod having a coating of a low hydrogen flux thereon, preferably consisting of calcium carborate, ferric oxide, aluminum oxide, silicon dioxide and clay.

DESCRIPTION OF THE PREFERRED EMBODIMENTS OF THE INVENTION

As before noted, the present invention concerns a process for welding white cast iron and special welding rod which is used in this process. For the purpose to this invention, white iron shall be cast iron having the composition set forth in Table 1 below.

Table 1

| (White Iron Composition) | |
|---|---|
| Element | Weight Percent |
| Carbon | 1.80 – 3.60 |
| Silicon | 0.5 – 1.90 |
| Manganese | 0.25 – 0.80 |
| Sulphur | 0.06 – 0.20 |
| Phosphorus | 0.06 – 0.18 |
| | Bal. Fe, plus incidential impuriteis |

In the practice of the invention, in general, the welding of the cast iron structure is accomplished as follows:

a. the metal surface is prepared for welding by scarfing it with a selected rod so as to not leave any charred surface, b. the surface to be welded is scarfed to the proper width in order to insure that the total welded surface will be penetrated, c. the selected flux coated welding rod is applied to the desired degree, and d. the setting of amperage and voltage on the welding machine are maintained within the limits recommended for the selected welding rod.

When utilizing the technique of the invention the amount of electric current to be employed is a function of welding rod size. Specifically, the electric current to be utilized generally follows the guide lines set forth in Table 2 below.

Table 2

| Rod Diameter | Amperage |
|---|---|
| 1/4 | About 625 to about 700 |
| 3/8 | About 725 to about 850 |
| 1/2 | About 900 to about 100 |
| 5/8 | About 1100 to about 1500 |

The welding rod of the invention contains, by weight, from about 2.30 to about 3.00 percent carbon, from about 0.03 to about 0.06 percent chromium, from about 0.01 to about 0.04 percent nickel, about 0.01 percent molybdenum, from about 0.82 to about 0.90 percent manganese, from about 0.023 to 0.032 percent sulphur, from about 0.103 to about 0.115 percent phosphorus, about 2.64 percent silicon, with the balance being iron plus incidental impurities.

One method which is especially suitable for the fabrication of welding rod of the invention is to start with a suitable iron base alloy having a carbon content of 1.65 weight percent. To this alloy sufficient ingredients are added to bring the rod to the desired content.

In addition, the welding rod of the invention is a low hydrogen rod, i.e., it is provided with a suitable flux to prevent the inclusion of hydrogen in the weld. Such fluxes are well known in the art and therefore will not be discussed in detail. However, a specific flux composition which has worked exceptionally well includes, by weight, about 43.6 percent calcium carbonate, about 29.2 percent ferric oxide, about 12.5 percent aluminum oxide, about 6.2 percent silicon dioxide, and about 8.5 percent clay. Also, it should be noted with regard to this preferred fluxing composition, that when direct current welding is concerned it is preferred to use a sodium silicate clay whereas when alternating current welding is involved it is preferred to use a potassium silicate clay.

The flux can be applied to the concerned welding rod in a number of ways. For example, the rod can be grooved or cored and the so-formed cavity filled with the fluxing material. However, it is preferred to simply coat the concerned welding rod with the desired fluxing material.

In view of the fact that the method manufacture and applying the fluxing material are well known in the art the same shall not be described herein in detail.

The instant invention has been successfully practiced with numerous welding rods of the type hereinbefore described. A typical example of the practice of the invention is as follows:

EXAMPLE 1

A specimen of cast iron was selected and surface treated by scarfing. The scarfing was continued to the degree necessary to insure that the total surface to be welded would be penetrated. A weld was then applied thereto by means of a welding rod containing, by weight, about 2.60 percent carbon, about 0.03 percent chromium, about 0.01 percent nickel, about 0.01 percent molybdenum, about 0.82 percent manganese, about 0.023 percent sulphur, about 0.103 percent phosphorus, about 2.64 percent silicon, with the balance being iron plus incidental impurities, with the rod having a flux coating thereon consisting of, by weight, about 43.6 percent calcium carbonate, about 29.2 percent ferric oxide, about 12.5 percent aluminum oxide, about 6.2 percent silicon dioxide, and about 8.5 percent clay. The welding rod was about 18 inches in length with a diameter of about ⅛ inches. The welding current ranged from about 1100 to about 1500 amps.

The resultant weld was then physically inspected and it was determined that a continuous, bonded, metallurgically suitable weld had been obtained.

EXAMPLE 2

The experiment described in Example 1 was repeated with the only difference being that the welding rod contained, by weight, about 2.80 percent carbon, about 0.04 percent chromium, about 0.03 percent nickel, about 0.01 percent molybdenum, about 0.87 percent manganese, about 0.024 percent sulphur, about 0.104 percent phosphorus, about 2.64 percent silicon, with the balance being iron plus incidental impurities.

The resultant weld was metallurgically sound.

EXAMPLE 3

The experiment described in Example 1 was repeated with the only difference being that the welding rod contained, by weight, about 3.00 percent carbon, about 0.05 percent chromium, about 0.03 percent nickel, about 0.01 percent molybdenum, about 0.90 percent manganese, about 0.028 percent sulphur, about 0.108 percent phosphorus, about 2.64 percent silicon, with the balance being iron plus incidental impurities.

The resultant weld was metallurgically sound.

EXAMPLE 4

The experiment described in Example 1 was repeated with the only difference being that the welding rod contained, by weight, about 2.30 percent carbon, about 0.06 percent chromium, about 0.04 percent nickel, about 0.01 percent molybdenum, about 0.90 percent manganese, about 0.032 percent sulphur, about 0.115 percent phosphorus, about 2.64 percent silicon, with the balance being iron plus incidental impurities.

The resultant weld was metallurgically sound.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as foll within the true spirit and scope of the invention.

It is claimed:

1. A process for the electric arc welding of cast iron containing, by weight, about 1.80 to about 3.60 percent carbon, about 0.50 to about 1.90 percent silicon, about 0.25 to about 0.80 percent manganese, about 0.06 to about 0.20 percent sulphur, about 0.06 to about 0.18 percent phosphorus, with the balance being iron plus incidental impurities which comprises:

electrically applying to the cast iron to be welded, at welding temperatures, a welding material obtained by simultaneously melting a welding rod containing, by weight, from about 2.30 to about 3.00 percent carbon, from about 0.03 to about 0.06 percent chromium, from about 0.01 to about 0.04 percent nickel, about 0.01 percent molybdenum, from about 0.82 to about 0.90 percent manganese, from about 0.023 to about 0.032 percent sulphur, from about 0.103 to about 0.115 percent phosphorus, about 2.64 percent silicon, with the balance being iron plus incidental impurities, said welding rod being provided with an effective amount of a low hydrogen fluxing material comprised of a mixture of calcium carbonate, ferric oxide, aluminum oxide, silicon dioxide and clay.

2. The process of claim 1 wherein said welding rod has a coating of fluxing material thereon consisting essentially of about 43.6 weight percent calcium carbonate, about 29.2 weight percent ferric oxide, about 12.5 weight percent aluminum oxide, about 6.2 weight percent silicon dioxide, and about 8.5 weight percent clay.

3. The process of claim 2 wherein said clay is a sodium silicate clay.

4. The process of claim 2 wherein said clay is a potassium silicate clay.

5. The process of claim 1 wherein said welding rod consists essentially of by weight, about 2.60 percent carbon, about 0.03 percent chromium, about 0.01 percent nickel, about 0.01 percent molybdenum, about 0.82 percent manganese, about 0.023 percent sulphur, about 0.103 percent phosphorus, about 2.64 percent silicon, with the balance being iron plus incidental impurities.

6. The process of claim 1 wherein said welding rod consists essentially of by weight, about 2.80 percent carbon, about 0.04 percent chromium, about 0.03 percent nickel, about 0.01 percent molybdenum, about 0.87 percent manganese, about 0.024 percent sulphur, about 0.104 percent phosphorus, about 2.64 percent silicon, with the balance being iron plus incidental impurities.

7. The process of claim 1 wherein said welding rod consists essentially of by weight, about 3.00 percent carbon, about 0.05 percent chromium, about 0.03 percent nickel, about 0.01 percent molybdenum, about 0.90 percent manganese, about 0.025 percent sulphur, about 0.108 percent phosphorus, about 2.64 percent silicon, with the balance being iron plus incidental impurities.

8. The process of claim 1 wherein said welding rod consists essentially of by weight, about 2.30 percent carbon, about 0.06 percent chromium, about 0.04 percent nickel, about 0.01 percent molybdenum, about 0.90 percent manganese, about 0.032 percent sulphur, about 0.115 percent phosphorus, about 2.64 percent silicon, with the balance being iron plus incidential impurities.

9. A welding rod for welding cast white iron containing, by weight, from about 2.30 to about 3.00 percent carbon, from about 0.03 to about 0.06 percent chromium, from about 0.01 to about 0.04 percent nickel, about 0.01 percent molybdenum, from about 0.82 to about 0.90 percent manganese, from about 0.023 to about 0.032 percent sulphur, from about 0.103 to about 0.115 percent phosphorus, about 2.64 percent silicon, with the balance being iron plus incidential impurities having on the surface thereof a coating of fluxing material comprising a mixture of calcium carbonate, ferric oxide, aluminum oxide, silicon dioxide and clay.

10. The welding rod of claim 9 wherein said coating of fluxing material consisting essentially of about 43.6 weight percent calcium carbonate, about 29.2 weight percent ferric oxide, about 12.5 weight percent aluminum oxide, about 6.2 weight percent silicon dioxide, and about 8.5 weight percent clay.

11. The welding rod of claim 10 wherein said clay is a sodium silicate clay.

12. The welding rod of claim 10 wherein said clay is a potassium silicate clay.

13. The welding rod of claim 9 which consists essentially of by weight, about 2.60 percent carbon, about 0.03 percent chromium, about 0.01 percent nickel, about 0.01 percent molybdenum, about 0.82 percent manganese, about 0.023 percent sulphur, about 0.103 percent phosphorus, about 2.64 percent silicon, with the balance being iron plus incidental impurities.

14. The welding rod of claim 9 which consists essentially of by weight, about 2.80 percent carbon, about 0.04 percent chromium, about 0.03 percent nickel, about 0.01 percent molybdenum, about 0.87 percent manganese, about 0.024 percent sulphur, about 0.104 percent phosphorus, about 2.64 percent silicon, with the balance being iron plus incidental impurities.

15. The welding rod of claim 9 which consists essentially of by weight, about 3.00 percent carbon, about 0.05 percent chromium, about 0.03 percent nickel, about 0.01 percent molybdenum, about 0.90 percent manganese, about 0.028 percent sulphur, about 0.108 percent phosphorus, about 2.64 percent silicon, with the balance being iron plus incidental impurities.

16. The welding rod of claim 9 which consists essentially of by weight, about 2.30 percent carbon, about 0.06 percent chromium, about 0.04 percent nickel, about 0.01 percent molybdenum, about 0.90 percent manganese, about 0.032 percent sulphur, about 0.115 percent phosphorus, about 2.64 percent silicon, with the balance being iron plus incidential impurities.

* * * * *